United States Patent
Grgic et al.

(10) Patent No.: US 8,244,380 B2
(45) Date of Patent: Aug. 14, 2012

(54) SYSTEM AND METHOD FOR STORING DATA FROM AN INDUSTRIAL CONTROLLER

(75) Inventors: Richard J. Grgic, Painesville, OH (US); Thomas A. Walters, Painesville, OH (US); Dennis M. Wylie, Jr., Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 295 days.

(21) Appl. No.: 12/469,333

(22) Filed: May 20, 2009

(65) Prior Publication Data

US 2010/0298955 A1 Nov. 25, 2010

(51) Int. Cl.
*G05B 19/18* (2006.01)
*G05B 9/02* (2006.01)

(52) U.S. Cl. .......... 700/5; 700/2; 700/82; 709/213; 709/216; 709/217; 707/668; 707/705

(58) Field of Classification Search .......... 700/2, 5, 700/82; 709/213, 216–217; 707/668, 705
See application file for complete search history.

(56) References Cited

U.S. PATENT DOCUMENTS

| | | | | |
|---|---|---|---|---|
| 4,967,381 A | * | 10/1990 | Lane et al. | 702/81 |
| 5,400,331 A | * | 3/1995 | Lucak et al. | 370/401 |
| 5,491,531 A | * | 2/1996 | Adams et al. | 375/354 |
| 6,819,960 B1 | | 11/2004 | McKelvey et al. | |
| 7,123,974 B1 | * | 10/2006 | Hamilton | 700/87 |
| 7,424,327 B2 | * | 9/2008 | Grgic et al. | 700/9 |
| 7,793,203 B2 | * | 9/2010 | Zielinski | 714/801 |
| 2004/0255269 A1 | * | 12/2004 | Santori et al. | 717/109 |
| 2006/0123019 A1 | * | 6/2006 | Nguyen et al. | 707/100 |
| 2006/0178757 A1 | * | 8/2006 | Grgic et al. | 700/9 |
| 2006/0253549 A1 | | 11/2006 | Arakawa et al. | |
| 2008/0168218 A1 | | 7/2008 | Arakawa et al. | |
| 2009/0044600 A1 | * | 2/2009 | Morse | 73/38 |
| 2009/0239468 A1 | * | 9/2009 | He et al. | 455/41.2 |

FOREIGN PATENT DOCUMENTS

| | | |
|---|---|---|
| EP | 1 281 446 A1 | 2/2003 |
| EP | 1 357 465 A2 | 10/2003 |

OTHER PUBLICATIONS

European Search Report of EP Application No. 10163427.7 dated Jul. 27, 2010.

\* cited by examiner

*Primary Examiner* — Ramesh Patel
(74) *Attorney, Agent, or Firm* — Fletcher Yoder, P.C.; R. Scott Speroff; John M. Miller

(57) ABSTRACT

A system for storing data from an industrial control system having an industrial controller including a communication module and first memory containing data for controlling an industrial process is provided. The system comprises a computer separate from the industrial controller and having a second memory and an application for automatically accessing the data from the first memory of the industrial controller via the communication module and storing the data on the second memory.

23 Claims, 8 Drawing Sheets

SYSTEM AND METHOD FOR STORING DATA FROM AN INDUSTRIAL CONTROLLER

BACKGROUND

Figure 1:
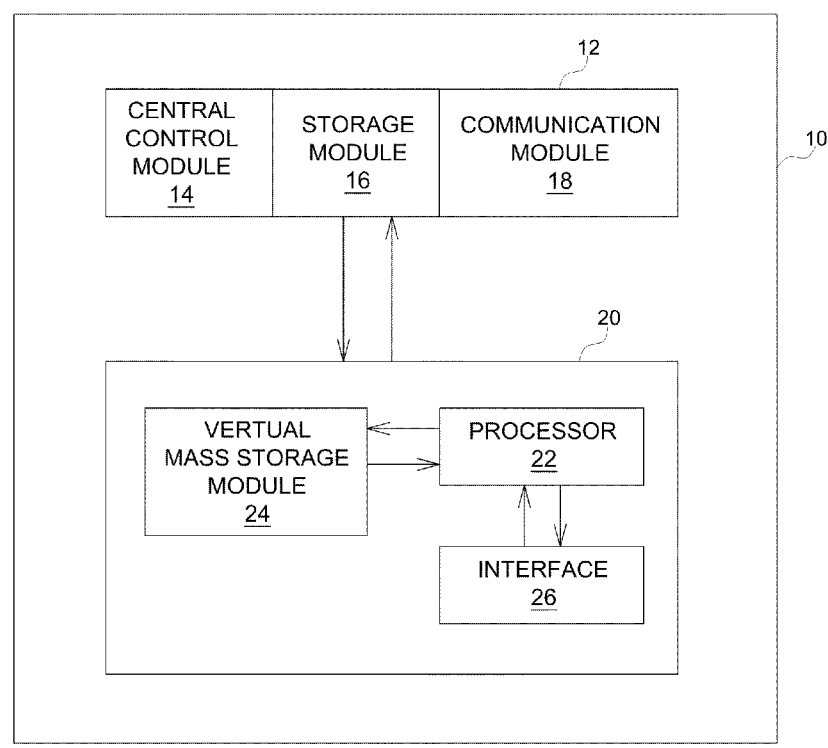

The invention relates generally to industrial controllers and more specifically to a system and method for transferring and storing data from an industrial controller onto a separate storage medium.

Industrial control systems are used in a variety of control applications, such as manufacturing and materials handling. An industrial control system typically employs several industrial controllers and computers. Typically, the industrial controller is in communication with several devices such as networked control devices, overload relays, network expanders, sensors and other input devices, and an interface for integrating additional components.

Each industrial controller (in the industrial control system) performs specific functions to enable the industrial control system to control various devices, such as motors, valves, actuators, and so forth, depending upon the particular application. Typically, an industrial controller has various modules such as a central control module, a storage module, and a communications module. The central control module of an industrial controller typically executes program files associated with the various devices that are in communication with the industrial controller.

The communication module facilitates communication over one or more communication lines, with the various devices that are controlled by the industrial controller. Examples of communication modules include, but are not limited to, Ethernet controllers, DeviceNet controllers, ControlNet controllers, FireWire controllers, or FieldBus controllers and the like.

The storage module stores data for controlling the associated devices. It is often required to backup the data stored in the storage module of the industrial controller. One way for backing up the data stored in storage module is by physically removing a memory medium the storage module from the industrial controller and copying the data on to a separate storage medium. However, this requires user intervention and in some cases, may also interrupt the operational state of the industrial controller.

Therefore, there is a need for an industrial controller capable of backing up data stored on the storage module without altering its state of operation and with minimum user intervention.

BRIEF DESCRIPTION

Briefly, according to one embodiment of the invention, a system is provided for storing data from an industrial control system. The industrial control system includes an industrial controller having a communication module and first memory containing data for controlling an industrial process. The system comprises a computer separate from the industrial controller and having a second memory and an application for automatically accessing the data from the first memory of the industrial controller via the communication module and storing the data on the second memory.

In another embodiment, a method is provided for storing data from an industrial control system having an industrial controller having a communication module and first memory containing data for controlling an industrial process. The method comprises establishing a link between a computer separate from the industrial controller, the computer having second memory and an application for automatically accessing the data from the first memory of the industrial controller via the communication module, and transferring the data from the first memory to the second memory without altering the operational state of the industrial control system.

In another embodiment of the present invention, a system for storing data from an industrial control system comprises a plurality of industrial controllers, each industrial controller including a communication module and a first memory containing data for controlling a corresponding industrial process. The system further includes a plurality of computers separate from the plurality of industrial controllers, each computer having an application for automatically accessing the data from the first memory of at least one industrial controller via a respective communication module and storing the data on a second memory. The system further includes an enterprise level system coupled to the plurality of computers and configured to control each industrial process controlled by the plurality of industrial controllers.

In another embodiment, a method for restoring data to an industrial control system having an industrial controller having a communication module and a first memory comprises establishing a link between a computer separate from the industrial controller, the computer having second memory and an application for automatically accessing the data from the first memory of the industrial controller via the communication module, transferring the data from the first memory to the second memory without altering the operational state of the industrial control system and restoring the data to the industrial controller, wherein the data is transferred back from the second memory to the first memory without altering the operational state of the industrial control system.

DRAWINGS

Figure 2:
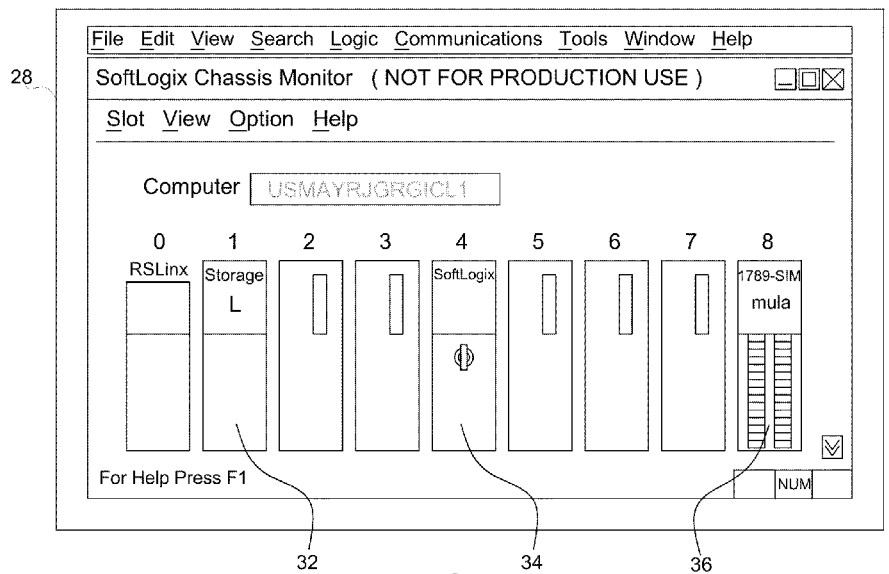
Figure 3:
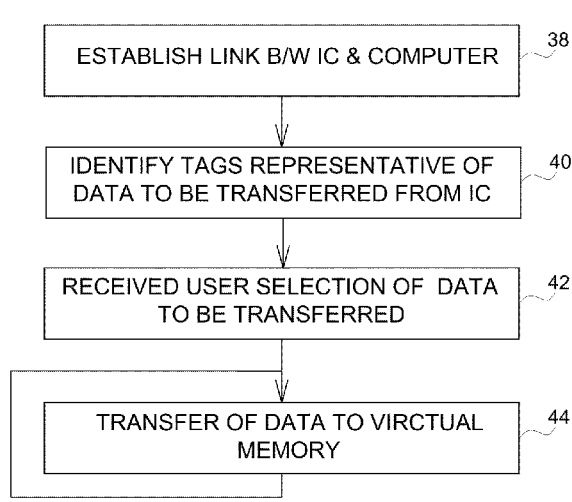
Figure 4:
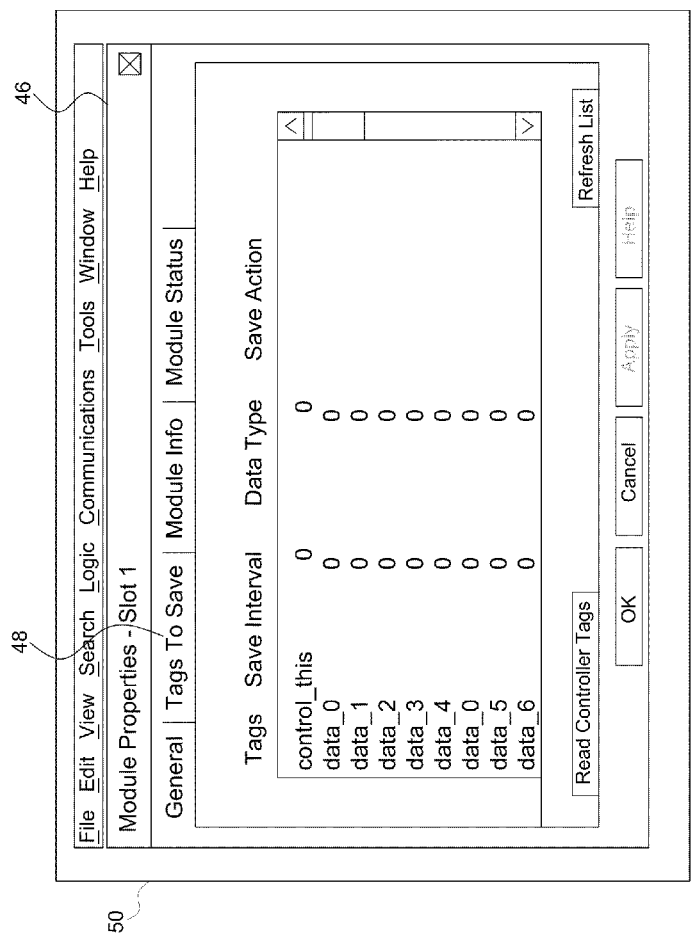
Figure 5:
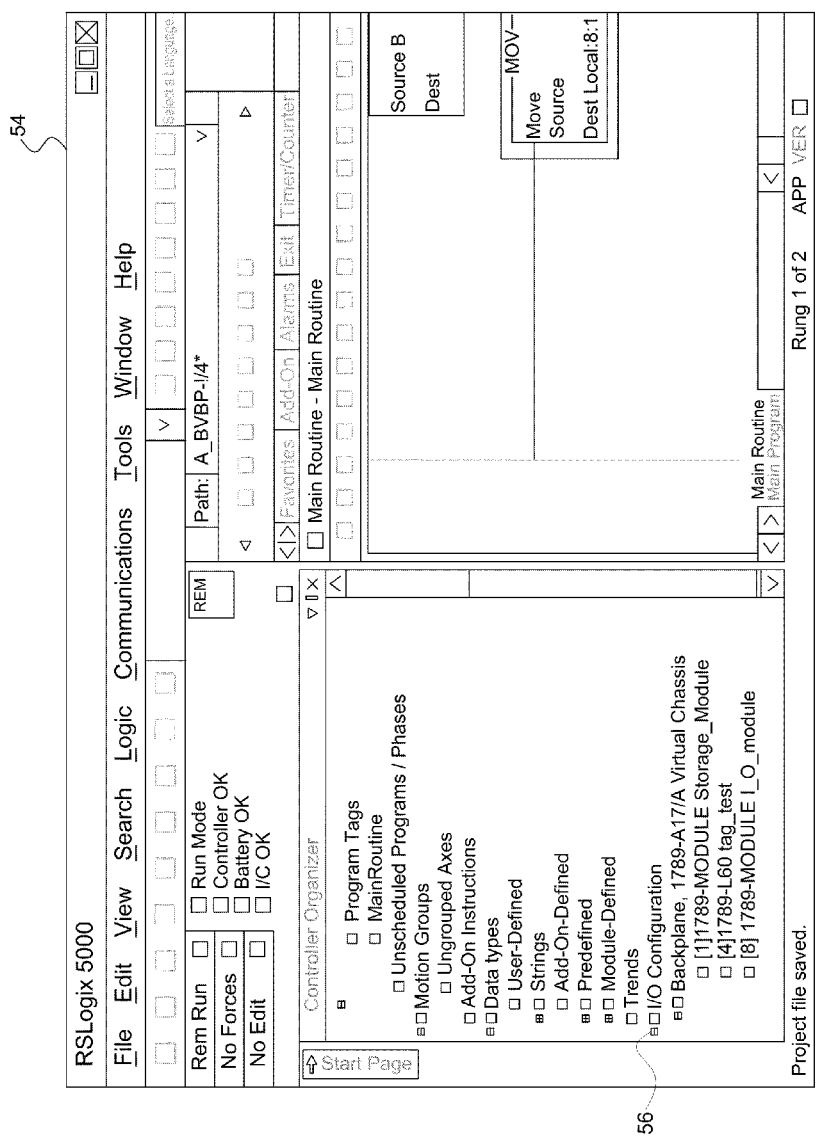
Figure 6:
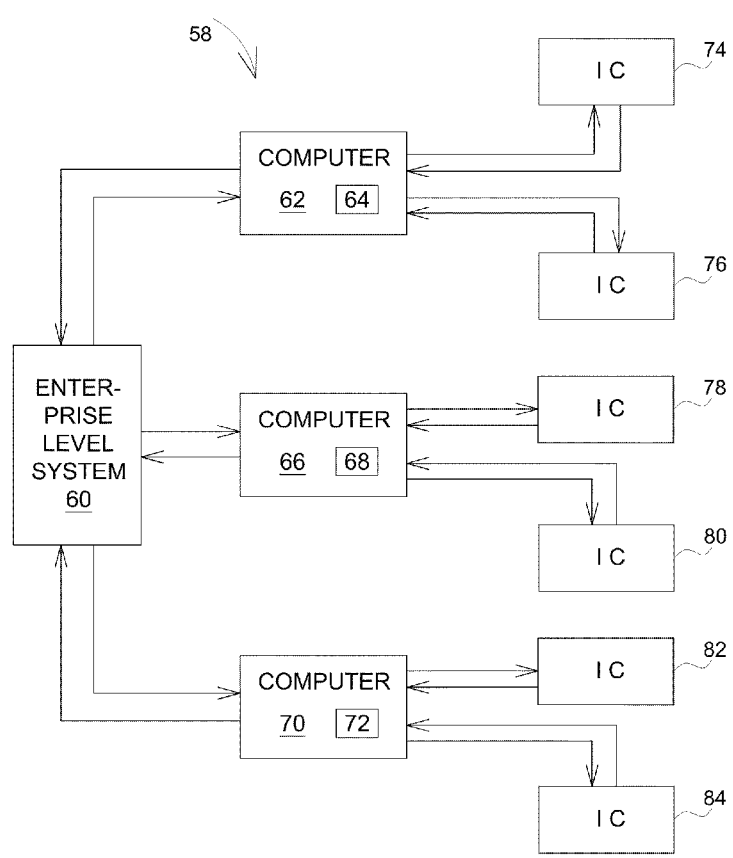
Figure 7:
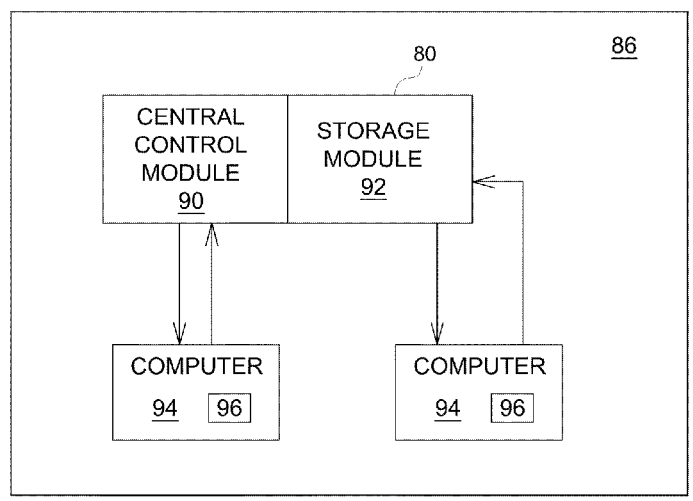
Figure 8:
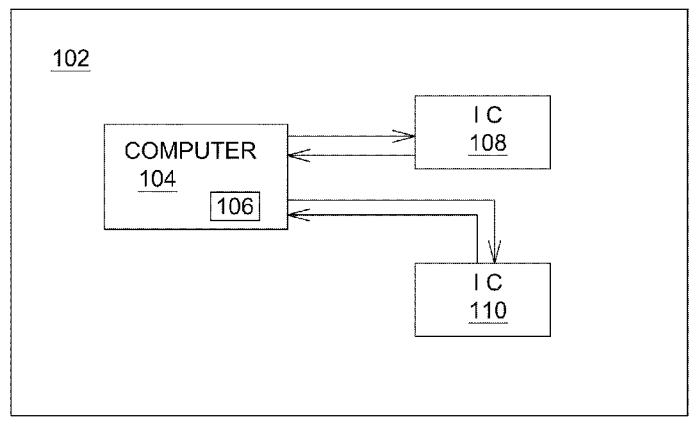
Figure 9:
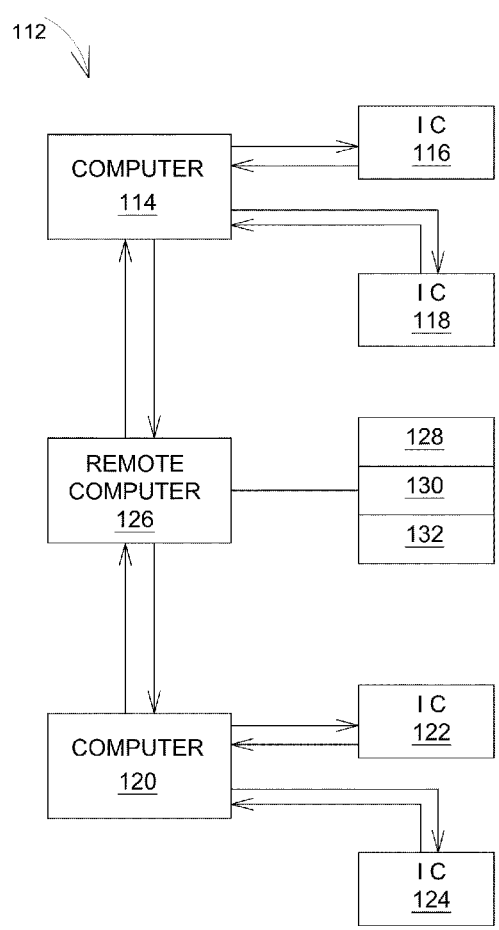
Figure 10:
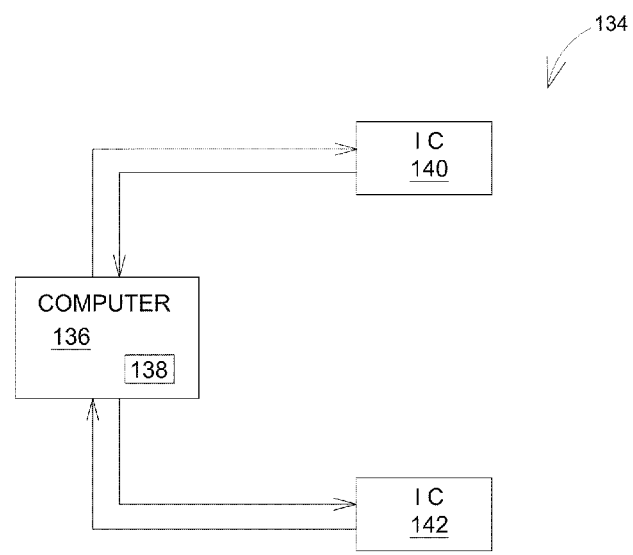

These and other features, aspects, and advantages of the present invention will become better understood when the following detailed description is read with reference to the accompanying drawings in which like characters represent like parts throughout the drawings, wherein:

FIG. 1 is a block diagram of an exemplary embodiment of an industrial controller system using a single virtual mass storage module implemented according to one aspect of the invention;

FIG. 2 is a block diagram of one embodiment of a virtual mass storage module implemented according to one aspect of the invention, FIG. 3 is a flow chart illustrating a method for storing data from an industrial controller on a virtual mass storage module, FIG. 4 is a diagrammatic representation of a user interface for transferring selected data from an industrial controller to a virtual mass storage module, FIG. 5 is a diagrammatic representation of an I/O tree implemented according to one aspect of the present invention;

FIG. 6 is a block diagram of a first embodiment of an industrial control system according to one aspect of the invention, FIG. 7 is a block diagram of a second embodiment of an industrial control system implemented according to one aspect of the invention, FIG. 8 is a block diagram of a third embodiment of an industrial control system implemented according to one aspect of the invention, FIG. 9 is a block diagram of a fourth embodiment of an industrial control system implemented according to one aspect of the invention, and FIG. 10 is a block diagram of a fifth embodiment of an industrial control system implemented according to one aspect of the invention.

DETAILED DESCRIPTION

FIG. 1 is a diagrammatic representation of an industrial control system implemented according to one aspect of the invention. The industrial control system 10 comprises industrial controller 12 and computer 20. Each component is described in further detail below.

Industrial controller 12 includes a central control module 14, a first memory generally referred to as storage module 16 and communication module 18. Although the storage module 16 is shown separately, it may be noted that the storage module may also be a part of central control module 14. The central control module is designed to control multiple devices by executing various software programs. The storage module is configured to store data such as programmable data including operating programs for operating the controller, control program for controlling an industrial process, and configuration data used by the operating program and control program. The storage module may also store individual programmable data for each module in the industrial controller. The communication module facilitates communication with the computer system. In one embodiment, the communication module comprises an Ethernet card.

As will be appreciated by those skilled in the art, the industrial controller 12 will typically utilize a real-time operating system that provides deterministic operation. Control is generally treated as the highest priority, and the controller provides predictable, repeatable response based upon the program instructions stored in the storage module 16, and upon inputs received from sensors and other input devices, operator instructions and so forth. In many applications it will be highly desirable that little or no interruption occur in the operation of the controller during control of a process. Accordingly, the techniques described below allow for backing up of certain selected data from the system under such highly demanding operating requirements.

Computer 20 is separate from the industrial controller, and includes components and software that permit it to automatically access certain designated data from the controller and to back the data up for later retrieval, review, monitoring, and so forth. The computer 20 may be physically situated near the controller, or may be remote from it, such as in a monitoring station in a facility or factory, or even off-site, such as in a management office or data repository. Computer 20 may include, among other components, a processor 22, a second memory, generally referred to as a virtual mass storage module 24, and an interface 26. A user employs computer 20 to configure the modules of the industrial controller and to control the various devices that are coupled to the industrial control system. To do so, specialized applications are executed by processor 22 to communicate with the industrial controller 12 and the devices connected of the industrial control system. The virtual mass storage module is used for data storage. Unlike the controller, computer 20 may run a conventional operating system without real-time, deterministic requirements. Computer 20 will typically run applications software configurable to permit the desired access to and backup of the selected data from the controller, as described below.

The computer automatically accesses the data from the storage module of the industrial controller via the communication module and stores the data on the virtual mass storage module 20. In one embodiment, the application is configured to access the data during operation of the industrial control system without altering the operational state of the industrial control system. A user is provided with a virtual representation of the industrial controller and its modules via interface 26. The interface is described in further detail below.

FIG. 2 is an exemplary screen view of a virtual representation of an industrial controller implemented according to one aspect of the invention, in a graphical user interface. Interface 26 as described in FIG. 1, appears on a browser 28 that is displayed on a monitor of computer 20. A user may control the various components of the industrial controller using the interface 26.

Interface 26 includes several virtual modules similar to the modules present in an industrial controller, such as industrial controller 12 described above. For example, the virtual mass storage module 32 corresponds to the storage module 16 of industrial controller 12 described in FIG. 1. Similarly, a virtual representation of a controller module 34, which may permit configuration with the controller itself, corresponds to the central control module 14, and I/O module 36 corresponds to the communication module 18 of the industrial controller. It may be noted that in other embodiments, the interface 26 may include only the virtual mass storage module 32.

Data from the storage module of the industrial controller 12 is transferred to the virtual mass storage module 32 using interface 28. The data is transferred without altering an operational state of the industrial control system. The manner in which the data is transferred is described in further detail below. It should be noted that the graphical user interface illustrated in FIG. 2 is produced by and permits access to programming instructions for configuring the selective access to and storage of data from the industrial controller.

FIG. 3 is a flow chart depicting one method by which data is transferred from the industrial controller to a virtual mass storage module according to one aspect of the invention. At step 38, a communication link is established between the industrial controller and a computer that is separate from the industrial controller. In one embodiment, the communication link may be established by using common industrial protocol (CIP) using Ethernet, ControlNet, DeviceNet and the like. In other embodiments, the communication link is established using non-CIP based protocols such RS232. In one embodiment, the link is initially established by the industrial controller accessing the computer. In a more specific embodiment, the link is initially established via a communication module.

In step 40, the data to be transferred from the storage module of the industrial controller to the virtual mass storage module is identified. In one embodiment, the data is identified using tags. In a further embodiment, a user identifies the data to be transferred. Such user configuration may be used to identify a subset of the available data from the controller that is to be backed up, such as system configuration data, device configuration data, state data and values, and so forth. The tags may be used in this identification process. Once identified, the data may be automatically identified.

In step 42, the processor receives information on the data to be transferred. In step 44, the data is transferred from the storage module of the industrial controller to the virtual mass storage module. In a further embodiment, the data from the virtual mass storage module can be transferred to a storage module of a separate industrial controller. The process continues by continuously receiving information about the data to be transferred and transferring the data to the virtual mass storage module.

As described in step 40, the data that is to be transferred to the virtual mass storage module may be identified using several tags. FIG. 4 is a diagrammatic representation of a user interface for transferring selected data from an industrial controller to a virtual mass storage module. The interface 46 appears on a browser 50 and displays the tags representative of data stored in the industrial controller.

In the illustrated embodiment, several tabs are present on the interface and each tab provides specific information the user. All available tags in the industrial controller that is coupled to the virtual mass storage module are listed under tab 48. In one embodiment, the user configures or selects each tag, such as with a left mouse click on the tag name. The user configures attributes of the industrial controller backup features, such as rate of backup, time to initiate backup, the files or data to be copied or possibly priority of the execution of the backup. In one embodiment, a dialog box is presented to a user and by entering a value, a save operation can be automatically initiated.

The user may configure the virtual mass storage module by placing the virtual mass storage module in an I/O tree as shown in FIG. 5. The I/O tree 54 appears on a browser 56. A user can configure the storage module represented by the connections. In one embodiment, the storage module is represented by a specific drive letter available to the virtual mass storage module.

Although the above technique is generally described with reference to an industrial control system with one industrial controller and one computer, several embodiments of industrial control systems comprising one or more industrial controllers and one or more computers may also be implemented using the techniques described above. FIG. 6 through FIG. 10 are exemplary embodiments of alternative an industrial control systems and arrangements employing the techniques described above.

FIG. 6 is a block diagram of one embodiment of an industrial control system implemented according to one aspect of the present invention. Industrial control system 58 comprises an enterprise level system 60. The enterprise level system 60 is in communication with computers 62, 66 and 68. Each computer is communication with one or more industrial controllers. For example, computer 62 is in communication with industrial controllers 74 and 76. Similarly, computer 66 is in communication with industrial controllers 78 and 80 and computer 70 is in communication with industrial controllers 82 and 84.

During a back up operation, each computer is configured to access data from the industrial controller with which it is in communication. The data identified from each industrial controller is then transferred and stored in the virtual mass storage module of the computer. For example, data from the industrial controllers 74 or 76 is transferred and stored in virtual mass storage module 64 on computer 62. Similarly, data from the industrial controllers 78 and 80 is transferred and stored in virtual mass storage module 68 on computer 66, and data from the industrial controllers 82 or 84 is transferred and stored in virtual mass storage module 72 on computer 70.

The enterprise level system 60 is configured to access the virtual mass storage modules 64, 68 and 72 using any suitable data collection software. In one embodiment, the enterprise level system is configured to transfer data from one virtual mass storage module to another. The data thus transferred may be then restored to another industrial controller. For example, the enterprise level system 60 may transfer data from virtual mass storage module 64 to virtual mass storage module 68. Subsequently, computer 66 may transfer the transferred data to industrial controller 78 without interrupting the operation of the industrial controller. Selection of data for transfer, and scheduling of such transfers may be performed in the same manner as described above.

FIG. 7 is a block diagram of one embodiment of a further alternative industrial control system. In this embodiment, data from a single industrial controller is stored on more than one virtual mass storage module. Industrial control system 86 comprises industrial controller 80, computer 94 and computer 98. Each block is described in further detail below.

Industrial controller 80 comprises several modules including central control module 90 and storage module 92. Industrial controller 80 is in communication with computer 94 which includes a virtual memory 96, and computer 98 with virtual memory 100.

During a back up operation, computers 94 and 98 is configured to automatically access data from the storage module 92 of the industrial controller. The data is transferred and stored in virtual mass storage module 96 and/or virtual mass storage module 100 without altering an operational state of the industrial controller 80. During a restore operation, the data from the virtual mass storage module 96 and 100 is transferred back to the industrial controller 80. Here again, selection of data to be transferred to the virtual storage devices, and scheduling for the transfers may be performed as described above. It should be noted that the multiple computers that back up the data may receive the same or different data, depending upon such factors as the type and purpose of the data, the redundancy desired, and so forth.

FIG. 8 is a block diagram of a further embodiment of an industrial control system implemented according to aspects of the present invention. In this embodiment, data from two industrial controllers is stored on a single virtual mass storage module. Industrial control system 102 comprises computer 104, virtual mass storage module 106 and industrial controllers 108 and 110.

Industrial controllers 108 and 110 are in communication with computer 104. Computer 104 includes a virtual mass storage module 106. During a back up operation, computer 104 is configured to automatically access data from the industrial controllers 108 and 110. The data is transferred and stored in virtual mass storage module 106 without altering an operational state of the industrial controllers 108 and 110. During a restore operation, the data from the virtual mass storage module 106 is transferred back to the industrial controller 108 or 110. Here again, selection and scheduling of the data for transfer may be performed as outlined above. It should also be noted that in the interface accessible by the user, the virtual mass storage module may appear as a single or as multiple storage modules. In the latter case, the data selected for transfer may appear to the user to be completely separately stored (i.e., on a separate virtual mass storage module) in the computer 104.

FIG. 9 is a block diagram of a further embodiment of an industrial control system implemented according to the present invention. In this embodiment, data from multiple industrial controllers is stored on multiple virtual mass storage modules using a remote computer. Industrial control system 112 comprises computers 114 and 120, remote computer 126, and industrial controllers 116, 118, 122 and 124.

Remote computer 126 is configured to access computers 114 and 120. Remote computer 126 includes virtual mass storage modules 128, 130 and 132. Computer 114 is configured to automatically access data from industrial controllers 116 and 118. Similarly, computer 120 is configured to automatically access data from industrial controllers 122 and 124. Selection of what data to be transferred from each controller may be performed as summarized above, and here again, the data may be different or at least partial redundancy may be provided for the back up.

During a backup operation, remote computer 126 accesses the data from industrial controller 116 and 118 via computer 114. Upon identification of the data to be transferred, the remote computer transfers the data to at least one of virtual mass storage modules 128, 130 and 132. During a restore operation, remote computer 126 may transfer data stored in the virtual mass storage modules 128, 130 and 132 to any one of the industrial controller via computers 114 and 120.

FIG. 10 is a block diagram of another embodiment of an industrial control system implementing the present invention. In this embodiment, data from one industrial controller is transferred to another industrial controller. Industrial control system 134 comprises computer 136, and industrial controllers 140 and 142.

During a backup operation, computer 136 accesses data from industrial controller 140 and stores the data on virtual mass storage module 138. In an event that industrial controller 142 requires specific data for a controlling an industrial process, the computer 136 is configured to transfer data stored in the virtual mass storage module 138 to industrial controller 142. Thus the industrial control system may continue to operate without any interruption.

The techniques described above have many advantages including backing up data on the industrial controller without the need to physically remove the storage module. Also, the backup operation is performed without altering the operational state of the industrial control system. That is, the backup operation can be performed while the industrial controller is operational and performing system control and monitoring functions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for storing data from an industrial control system having an industrial controller including a communication module and first memory containing data for controlling an industrial process, the system comprising:
    a computer separate from the industrial controller and having a second memory and an application for automatically accessing the data from the first memory of the industrial controller via the communication module and storing the data on the second memory.

2. The system of claim 1, wherein the data accessed from the first memory and stored on the second memory is user selectable via an interface of the application.

3. The system of claim 2, wherein the interface represents the second memory as a virtual module of the industrial controller, and a user may select data for accessing and storage via the virtual module representation.

4. The system of claim 2, wherein the first memory is removable from the industrial controller.

5. The system of claim 2, wherein the industrial controller is configured to automatically store data on the first memory during control of the industrial process.

6. The system of claim 1, wherein the application is configured to access the data during operation of the industrial control system without altering the operational state of the industrial control system.

7. The system of claim 1, wherein the industrial control system includes an interface configured to enable communication with the computer.

8. The system of claim 1, wherein the computer includes an interface configured to enable communication with the industrial controller. configured to automatically store data on the first memory during control of the industrial process.

9. The system of claim 1, wherein the communication module is an Ethernet card.

10. A method for storing data from an industrial control system having an industrial controller having a communication module and first memory containing data for controlling an industrial process, the method comprising:
    establishing a link between a computer separate from the industrial controller, the computer having second memory and an application for automatically accessing the data from the first memory of the industrial controller via the communication module; and
    transferring the data from the first memory to the second memory without altering the operational state of the industrial control system.

11. The method of claim 10, wherein the link is initially established by the industrial controller accessing the computer.

12. The method of claim 11, wherein the link is initially established via the communication module of the industrial controller.

13. The method of claim 10, wherein the application identifies a plurality of tags from the industrial controller; wherein the plurality of tags represent data available for transfer.

14. The method of claim 13, further comprising receiving user selections of data to be transferred from a listing of the plurality of tags.

15. The method of claim 14, wherein the data is automatically transferred on a periodic basis.

16. The method of claim 10, further comprising transferring the data from the second memory to a third memory, wherein the third memory contains data to control the industrial process.

17. A system for storing data from an industrial control system;
    the system comprising:
    a plurality of industrial controllers, each industrial controller including a communication module and a first memory containing data for controlling a corresponding industrial process;
    a plurality of computers separate from the plurality of industrial controllers, each computer having an application for automatically accessing the data from the first memory of at least one industrial controller via a respective communication module and storing the data on a second memory; and
    an enterprise level system coupled to the plurality of computers and configured to control each industrial process controlled by the plurality of industrial controllers.

18. The system of claim 17, wherein the data accessed from the first memory and stored on the second memory is user selectable via an interface of the application.

19. The system of claim 17, wherein the interface represents the second memory as a virtual module of the industrial controller, and a user may select data for accessing and storage via the virtual module representation.

20. The system of claim 17, wherein the application is configured to access the data during operation of the plurality of industrial controllers without altering the operational state of the industrial controllers.

21. The system of claim 17, wherein each industrial controller includes an interface configured to enable communication with the computer.

22. A method for restoring data to an industrial control system having an industrial controller having a communication module and a first memory, the method comprising:
   establishing a link between a computer separate from the industrial controller, the computer having second memory and an application for automatically accessing the data from the first memory of the industrial controller via the communication module; and
   transferring the data from the first memory to the second memory without altering the operational state of the industrial control system, and
   restoring the data to the industrial controller, wherein the data is transferred back from the second memory to the first memory without altering the operational state of the industrial control system.

23. The method of claim 22, wherein the first memory comprises a removable memory.

* * * * *